(No Model.)

H. MILLER.
AXLE LUBRICATOR.

No. 554,451. Patented Feb. 11, 1896.

Inventor
Harry Miller,
By his Attorneys,
C. A. Snow & Co.

Witnesses
John C. Shaw
H. F. Riley

UNITED STATES PATENT OFFICE.

HARRY MILLER, OF CLARENCE, IOWA.

AXLE-LUBRICATOR.

SPECIFICATION forming part of Letters Patent No. 554,451, dated February 11, 1896.

Application filed August 31, 1895. Serial No. 561,143. (No model.)

*To all whom it may concern:*

Be it known that I, HARRY MILLER, a citizen of the United States, residing at Clarence, in the county of Cedar and State of Iowa, have invented a new and useful Axle-Lubricator, of which the following is a specification.

The invention relates to improvements in axle-lubricators.

The object of the present invention is to improve the construction of axle-lubricators, and to provide a simple and inexpensive construction whereby the spindles of an axle may be lubricated from time to time without removing the wheels of a vehicle, and which will prevent a waste of lubricant and will avoid gumming or clogging.

The invention consists in the construction and novel combination and arrangement of parts hereinafter fully described, illustrated in the accompanying drawings, and pointed out in the claim hereto appended.

Figure 1:
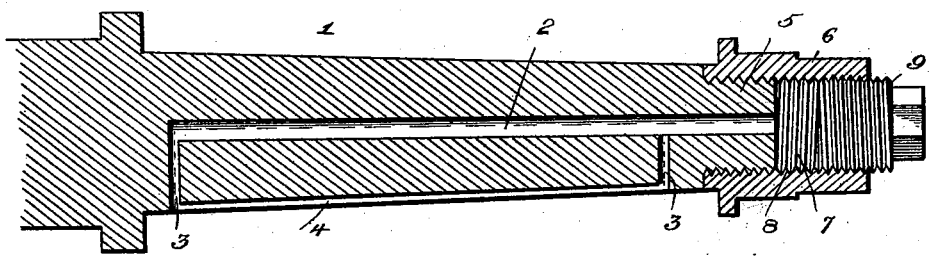
Figure 2:
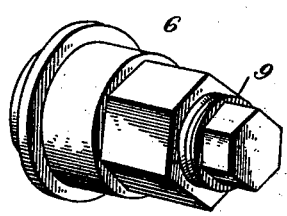
Figure 3:
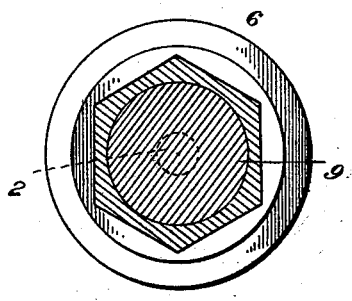

In the drawings, Figure 1 is a longitudinal sectional view of one end of an axle provided with a lubricating device constructed in accordance with this invention. Fig. 2 is a detail perspective view of the axle-nut. Fig. 3 is a transverse sectional view of the same.

Like numerals of reference indicate corresponding parts in all the figures of the drawings.

1 designates a spindle of an axle having a central longitudinal bore 2 extending inward the length of the spindle and communicating by inner and outer perforations 3 with an exterior gutter or groove 4, disposed longitudinally of the spindle and formed in the outer face thereof. The spindle has its outer end 5 threaded in the usual manner and receives an axle-sleeve 6, which screws up against the shoulder formed by reducing and threading the outer end of the spindle.

The axle-nut 6 consists of a sleeve threaded throughout its entire length and having its external configuration similar to that of an ordinary axle-nut. The sleeve extends beyond the end of the spindle to form a lubricant-receptacle 7, and the inner portions of the threads 8 of the same engage those of the spindle. The outer portion of the sleeve, the interior of which is of the same diameter as the inner portion, receives an adjustable plug 9, which is of the same diameter as the threaded end of the spindle, and which is adapted to be advanced from time to time into the sleeve to force a lubricant through the longitudinal bore or opening into the groove or gutter 4 by way of the perforations 3. The adjustable plug is carried by the axle-nut, and when the latter is removed from the spindle the former is not disturbed and does not require any adjustment.

The lubricant preferably consists of an axle-grease adapted to be readily placed in the receptacle of the sleeve, and the spindle may be oiled from time to time by simply rotating the adjusting-plug. In this manner the lubricant is not wasted, and it is unnecessary to remove a wheel to lubricate the spindle.

The axle-sleeve 6 has a polygonal outer face or wrench-seat, and the outer extremity of the adjusting-plug is likewise provided with a polygonal portion or wrench-seat, and the parts may be readily manipulated by an ordinary monkey-wrench or similar tool.

It will be seen that the lubricator is exceedingly simple and inexpensive in construction, and that it is capable of enabling a spindle to be lubricated from time to time without removing the wheel. It will also be apparent that the lubricant is not wasted, and is kept free from dust, and that gumming is prevented.

Changes in the form, proportion, and the minor details of construction may be resorted to without departing from the principle or sacrificing any of the advantages of this invention.

What I claim is—

In an axle-lubricator, the combination, with a spindle provided with a longitudinal opening or bore, and having an exterior groove or gutter communicating with the opening or bore by a perforation or extension of the latter, of a sleeve threaded throughout its entire length, arranged on the threaded portion of the spindle and projecting beyond the same to provide a lubricant-receptacle, said sleeve having an external configuration similar to an ordinary axle-nut, and a threaded plug of the same diameter as the threaded portion of the spindle, arranged within and engaging the threads of the outer portion of the sleeve and adapted to be advanced within the same to contract or entirely fill the lubricant-receptacle, whereby a lubricant contained within the receptacle may be forced into the bore or opening of the spindle, substantially as described.

In testimony that I claim the foregoing as my own I have hereto affixed my signature in the presence of two witnesses.

HARRY MILLER.

Witnesses:
FRED. HECHT,
C. B. HECHT.